July 28, 1959 C. VAN DER LELY ET AL Re. 24,676

RAKING DEVICE HAVING A RAKE WHEEL BEARING CRANK EXTENDING IN FORWARD DIRECTION

Original Filed June 18, 1953 3 Sheets-Sheet 1

INVENTORS
CORNELIS VAN DER LELY
ARY VAN DER LELY
BY Haseltine Lake & Co
AGENTS

July 28, 1959 C. VAN DER LELY ET AL Re. 24,676

RAKING DEVICE HAVING A RAKE WHEEL BEARING CRANK EXTENDING IN FORWARD DIRECTION

Original Filed June 18, 1953 3 Sheets-Sheet 2

INVENTORS
CORNELIS VAN DER LELY
ARY VAN DER LELY
BY: Haselline Lake & Co
AGENTS.

July 28, 1959 C. VAN DER LELY ET AL Re. 24,676

RAKING DEVICE HAVING A RAKE WHEEL BEARING CRANK EXTENDING IN FORWARD DIRECTION

Original Filed June 18, 1953 3 Sheets-Sheet 3

INVENTORS
CORNELIS VAN DER LELY
ARY VAN DER LELY
By: Hazeltine Lake & Co.
AGENTS.

United States Patent Office

Re. 24,676

Reissued July 28, 1959

24,676

RAKING DEVICE HAVING A RAKE WHEEL BEARING CRANK EXTENDING IN FORWARD DIRECTION

Cornelis van der Lely and Ary van der Lely, Maasland, Netherlands, assignors to C. van der Lely N.V., Maasland, Netherlands, a Dutch company Original No. 2,816,414, dated December 17, 1957, Serial No. 362,637, June 18, 1953. Application for reissue December 16, 1958, Serial No. 780,913

Claims priority, application Netherlands June 24, 1952

28 Claims. (Cl. 56—377)

Matter enclosed in heavy brackets [ ] appears in the original patent but forms no part of this reissue specification; matter printed in italics indicates the additions made by reissue.

This invention relates to agricultural implements and more specifically to devices for laterally raking together crop or other vegetable products lying on the ground.

In known raking devices having free wheeling rake wheels mounted on cranks, the cranks are always arranged so that the axle of the rake wheel is dragged behind its pivotal mounting so that, in passing ridges and ditches in the field, the wheel can readily follow the contours of the terrain without the occurrence of large stresses in the wheel or the crank. In general these devices require, however, a relatively heavy supporting frame for the rake wheels.

It is an object of the present invention to provide a raking device in which the supporting construction for the rake wheel or wheels is very simple and of light weight, so that a great saving of energy required for pulling or pushing the raking device may be obtained.

Another object of the invention is to provide the support with at least one crank carrying a rake wheel directly or indirectly and extending in a direction which is substantially opposite to the direction in which the conventional rake wheel bearing cranks extend, i.e. the axle of the rake wheel carried by said crank, reckoned in the direction from said axle to the foremost point of the rake wheel, is located before the pivot of said crank.

A further object is to provide the support with a second crank carrying directly or indirectly a second rake wheel extending in the conventional backward direction, i.e. substantially opposite to the direction of the first crank.

A still further object of the invention is to mount the rake wheels or some of the rake wheels on secondary cranks carried by primary cranks extending in forward direction and/or in backward direction.

With these and other objects, features and details in view, the invention will be hereinafter more fully described with reference to the accompanying drawings in which some embodiments of a raking device according to the invention have been illustrated by way of example and in which:

*Fig. 4 is a plan view of a further embodiment of the invention wherein all the rake wheels are carried by cranks.*

*Fig. 5 is a plan view of a further embodiment of the invention wherein a running wheel may be connected in a non-resilient manner.*

*Fig. 6 is a plan view of a further embodiment of the invention similar to Fig. 5, but having two sets of secondary cranks.*

Figure 1:
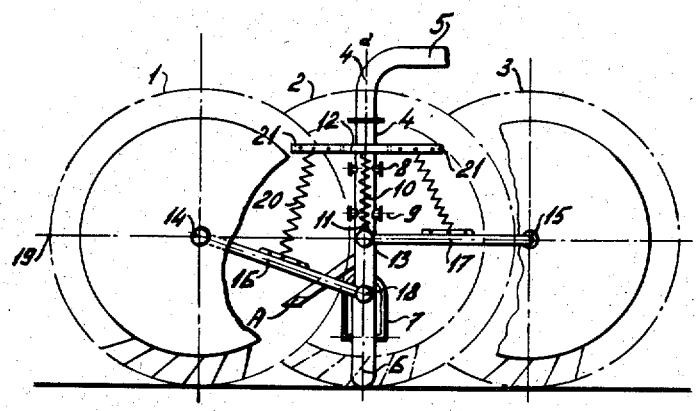
Fig. 1 shows a side view of a group of rake wheels provided in a device in accordance with one embodiment of the invention.

In Fig. 1, three rake wheels 1, 2 and 3, rake wheel 1 being the foremost and wheel 3 being the hindmost rake wheel, are fixed to a common support 4. This support is connected to a propellant device by means of a tube 5 in such a way that it is rotatable about a vertical centerline 4a. The support 4 is supported by a running wheel 6 having a fork 7 integral with or welded to a parallelogram construction which is pivotable upon axles 8 and 9 of the support 4. A spring 10 is arranged between a point 11 of the support and a point of a brace 12 through which the support 4 passes and which is rigidly connected to the fork 7. The rake wheel 2 is rotatably mounted upon an axle 13 which is rigidly fixed to the support 4, whereas the rake wheels 1 and 3 are rotatably mounted on axles of coupling devices such as the cranks 16 and 17, respectively, by means of respective hubs 14 and 15. The crank 17 is rotatable on the axle 13 and the crank 16 on an axle 18 which is rigidly fixed to the support 4 below said axle 13.

The crank 16 of the rake wheel 1 substantially extends in forward direction, i.e. reckoned in the direction from the hub 14 to the foremost point of the rake wheel 1. Thus, the crank pin is situated before the bearing 18 of the crank. The crank 17 of the rake wheel 3, however, extends in approximately the opposite direction.

It will be evident that the support 4 would have to have a much larger extension, especially in horizontal direction (and would be, therefore, of much greater weight) if the hub 14 of the rake wheel 1 were to be fixed to a crank which, in the same manner as the crank 17 of the rake wheel 3, would extend in rearward direction.

Due to the light construction of the device, there is a possibility that the crank 16 might be subjected to such pressure that the rake wheel 1 or the crank 16 are damaged, such as, for example, when said wheel 1 meets an obstacle in the field. This danger can be eliminated by a strong and rigid construction of the elements involved. Moreover, in the oblique position of the crank 16 as shown in Fig. 1, the risk of large forces occurring therein will be much smaller than in case of a crank taking a substantially horizontal position.

Furthermore, if the rake wheel has assumed a very low position and is then urged upwards against the edge of a ditch, large stresses may result in the rake wheels. The possibility of damage can be eliminated by preventing the crank arm 16 from moving downwards beyond a predetermined position by means of a suitable abutment A provided on the support 4, as well as by arranging a spring 20 between the crank 16 and a point on the bracket 12 or of a rod 21 fixed thereto.

Figure 2:
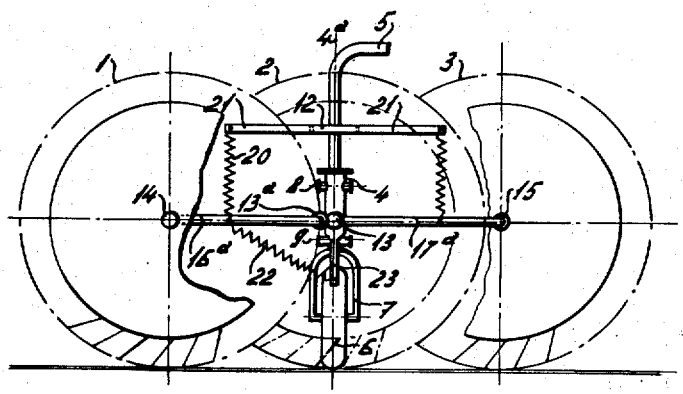
Fig. 2 is a view similar to that of Fig. 1, but relating to another embodiment of the invention, seen in the direction of the arrow in Fig. 3.
Figure 3:
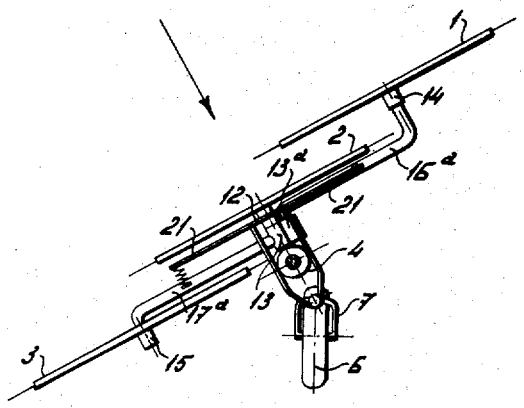
Fig. 3 is a plan view of the device shown in Fig. 2.

In the modified construction of the device shown in Figs. 2 and 3, corresponding parts have been indicated by the same reference numbers as in Fig. 1 with the reference character "a" appended. The cranks 16a (forwardly extending) and 17a carrying the rake wheels 1 and 3 are *mounted on and positioned relative to the frame differently than the cranks are mounted in Fig. 1,* [fixed in a second arrangement], the crank 17a being pivotably mounted on the axle 13 which also carries the rake wheel 2, and the crank 16a being rotatably mounted by means of a bearing 13a which is situated in the proximity of the axle 13 and is fixed to the crank 17a which extends through the axle 13. A construction of this kind presents the advantage that normally the bearing of the crank 17a has to transmit only small moments, whereas according to Fig. 1 the bearings of both cranks have to [trasmit] *transmit* considerable moments as is the case for the bearing 13a in Figs. 2 and 3.

An important feature of the device according to Figs. 2 and 3 is that the crank 16a, which is connected by a spring 20 to the rod 21, is moreover connected to a downwardly extending member 23 of the support 4 by means of a spring 22. The effect of this construction is that, when the rake wheel 1 meets an elevation in the field over which the mass of the rake wheel 2 (which is rigidly coupled to the mass of the support and the member 5) has to be lifted, the necessary movement for this lifting will have been already started by the vertical component of the increase of tension in the spring 22 which occurs when the rake wheel 1 is being elevated.

Figure 4:
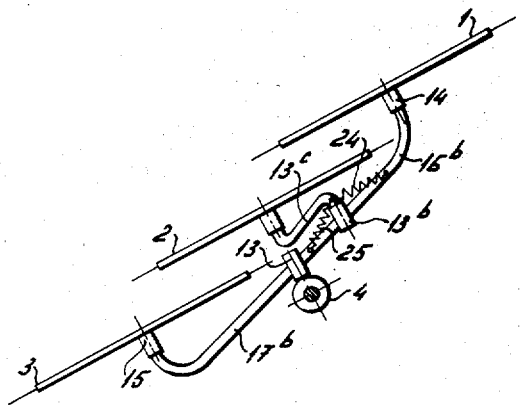
[Figs. 4, 5 and 6 show plan views of groups of rake wheels according to further embodiments of the invention.]

In a further embodiment of the invention shown in Fig. 4 all of the rake wheels 1, 2 and 3 are carried by cranks, *16b, 13c, and 17b, respectively*. The cranks 16b (forwardly extending) and 17b of the rake wheels 1 and 3 are rigidly connected to each other and rotatably mounted on the axle 13 which is fixed to the support 4. The flexibility of the rake wheel prevents any rake wheel from operating as a pivot for lifting the remaining rake wheels from the ground. A bearing 13b for a crank 13c on which the rake wheel 2 is provided is fixed on the crank 16b. The pressure of the rake wheel 2 on the ground may be decreased by a suitably arranged spring 24, while an opposed spring 25 may be provided. This embodiment also permits a very large saving of weight.

Figure 5:
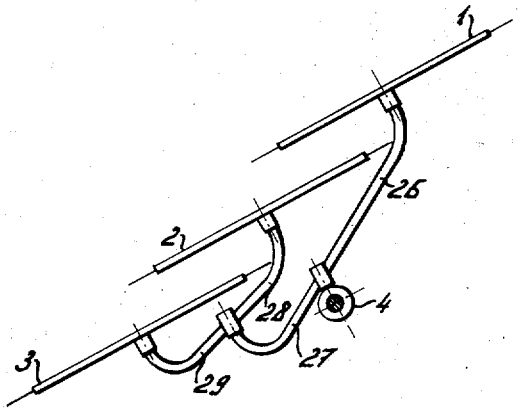

According to Fig. 5, the rake wheel 1 is fixed to the support 4 by means of a forwardly extending crank 26. The support 4 is supported by a supporting member including a running wheel 6 (*as shown in Fig. 3*) for ground traversing movement. A crank 27 extending in opposite direction is rigidly connected to the crank 26, said cranks 26 and 27 constituting a primary crank for supporting a row of rake wheels 1, 2 and 3 and said crank 27 carrying the secondary cranks 28 and 29 upon which the rake wheels 2 and 3 are mounted. The cranks 28 and 29 are rigidly secured together.

Figure 6:
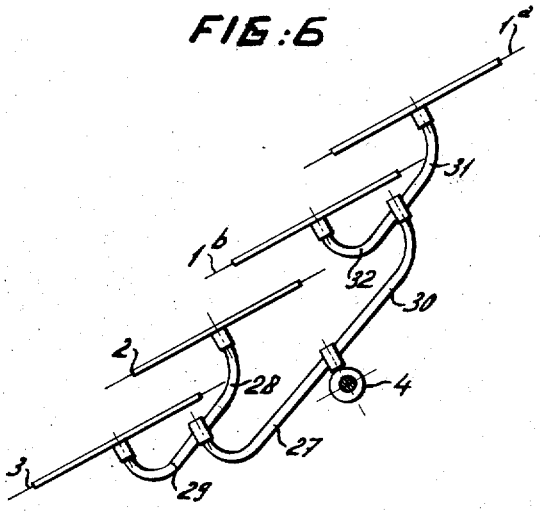

In the device shown in Fig. 6 the crank 27 fixed to the support 4 is somewhat longer than in Fig. 5 and crank 26 has been replaced by a primary crank 30 rigidly connected to the crank 27 and carrying secondary cranks 31 and 32 upon which are mounted the rake wheels 1a and 1b. In the drawing, the cranks 31 and 32 are rigidly connected together, but it will be evident that each of the rigid connections between two cranks could be likewise arranged in a resilient manner. *It will be understood by reference to the drawings that cranks 28 and 29 (in Figures 5 and 6) and cranks 30 and 31 (Fig. 6) constitute coupling devices between rake wheel 3 (Figs. 5 and 6) on one side and between rake wheel 1a (Fig. 6) on the other, and the axle adjoining support 4. Cranks 27 and 30 comprise first parts of said coupling devices and cranks 29 and 31 the second parts, the latter supporting rake wheels 1b and 2 through cranks 32 and 28, respectively.*

In the constructions according to Figs. 5 and 6, the pressure of the rake wheels on the ground differs very slightly when the crank arms are suitably dimensioned so that the support 4 needs to move upwards or downwards only a third or a fourth of the height or depth of an unevenness over which one of the rake wheels passes. In this kind of arrangement it is, therefore, possible to connect the support to the running wheel in a nonresilient manner.

In the embodiment shown in Fig. 6 some of the secondary cranks (such as 28 and 31) always extend in forward direction. It will be evident that also such embodiments are within the scope of this invention in which all secondary cranks extend in backward direction, but in which [due to a forwards extending primary crank (such as 30),] a rake wheel (for instance 1b) is provided, of which the axle, in the direction from the pivotal point of the rake wheel to the foremost point of said rake wheel, is situated before the pivotal point of [said] *the* primary crank (*such as 30*).

We claim:

1. A raking device comprising a mobile ground-supported frame having a front end, a freely rotatable raking wheel adjacent said front end, a first axle in said wheel, a second axle connected on said front end and substantially parallel to said first axle, and a coupling device extending forwardly from said second axle and having connection with said first axle to enable a pivotal movement of said raking wheel whereby said raking wheel is enabled to adapt itself to the ground and substance lying thereupon.

2. A device as claimed in claim 1, wherein the frame comprises support means allowing a vertical movement of said frame.

3. A device as claimed in claim 1, wherein said first axle defines an axis of rotation and wherein the axis of said first axle is substantially immovable with regard to said coupling device.

4. A raking device as defined in claim 1, wherein said second axle, with said rake wheel resting on the ground, is located nearer to the ground than said first axle.

5. A raking device as defined in claim 1 comprising means connected to said frame for the prevention of downward movement of said coupling device beyond a predetermined position.

6. A raking device comprising a mobile ground-supported frame having a front end, a freely rotatable first raking wheel adjacent said front end, a first axle in said first wheel, a second axle connected on said front end and substantially parallel to said first axle, a first coupling device extending forwardly from said second axle and having connection with said first axle, to enable a pivotal movement of said raking wheel whereby said raking wheel is enabled to adapt itself to the ground and substance lying thereupon, a second raking wheel, a third axle in said second wheel, a fourth axle connected on said frame and substantially parallel to said third axle, and a second coupling device extending rearwardly from said fourth axle and having connection with said third axle to enable a pivotal movement of said second raking wheel whereby said raking wheel is enabled to adapt itself to the ground and substance lying thereupon.

[7. A raking device as defined in claim 6, wherein said second axle and said fourth axle define coinciding axes.]

[8. A raking device as defined in claim 7, wherein said first and said second coupling devices are fixedly interconnected.]

9. A raking device as defined in claim 6, wherein said first and said second coupling devices are resiliently connected to said frame.

10. A raking device comprising a mobile ground-supported frame, a number of freely rotatable raking wheels, a first axle in one of said raking wheels, a second axle connected on said frame and substantially parallel to said first axle and a coupling device extending forwardly from said second axle and having connection with said first axle to enable a pivotal movement of said raking wheel whereby said raking wheel is enabled to adapt itself to the ground and substance lying thereupon, said coupling device comprising a first and a second part, and a hinged connection between said first and said second parts defining an axis substantially parallel to said first axle, said second part supporting another of said raking wheels, the movement of both of said parts being substantially effected by the contact of said raking wheels with the ground and rakable substance lying thereupon.

11. A raking device comprising a mobile ground-supported frame, a freely [rotaatble] *rotatable* raking wheel, a first axle in said wheel, a second axle connected on said frame and substantially parallel to said first axle, a coupling device connecting said first and said second axle to enable a pivotal movement of said raking wheel whereby said raking wheel is enabled to adapt itself to the ground and substance lying thereupon, and resilient means connected between said coupling device and said frame to restrict movement of said coupling device from its normal position.

[12. A raking device as defined in claim 11, wherein two springs are connected intermediate said frame and said coupling device, one of said springs resisting a movement of said coupling device in a first direction the other of said springs resisting a movement of said coupling device in the opposite direction.]

13. A raking device as defined in claim 11, wherein said mobile frame includes a supporting wheel resiliently mounted on said frame and a portion in non-resilient relationship to said supporting wheel, comprising resilient means connecting the coupling device with said portion.

14. A raking device comprising a mobile ground-supported frame, a freely rotatable raking wheel mounted on said frame, a first axle in said wheel, a second axle defining an axis which is immovable with respect to said frame and substantially parallel to said first axle, a coupling device extending forwardly from said second axle and having connection with said first axle to enable a pivotal movement of said raking wheel whereby said raking wheel is enabled to adapt itself to the ground and substance lying thereupon, a second raking wheel, a third axle in said second wheel, a fourth axle substantially parallel to said third axle, and a coupling device extending forwardly from said fourth axle and having connection with said third axle to enable a pivotal movement of said second raking wheel about said fourth axle whereby said raking wheel is enabled to adapt itself to the ground and substance lying thereupon.

15. A raking device comprising a mobile ground-supported frame having a front end, a freely rotatable raking wheel adjacent said front end, a first axle in said wheel, a second axle connected to said frame and defining an axis which is immovable with respect to said frame and which is substantially parallel to said first axle, and a coupling device extending forwardly from said second axle and having connection with said first axle to enable a pivotal movement of said raking wheel about said second axis whereby said raking wheel is enabled to adapt itself to the ground and substance lying thereupon.

16. A raking device comprising a mobile ground-supported frame having a front end, a freely rotatable raking wheel adjacent said front end, a first axle in said wheel, a second axle connected on said front end and substantially parallel to said first axle, and a coupling device extending forwardly from said second axle and having connection with said first axle.

17. A raking device comprising a mobile ground-supported frame having a front end, a freely rotatable first raking wheel adjacent said front end, a first axle in said first wheel, a second axle connected on said front end and substantially parallel to said first axle, a first coupling device extending forwardly from said second axle and having connection with said first axle to enable a pivotal movement of said raking wheel whereby said raking wheel is enabled to adapt itself to the ground and substance lying thereupon, a second raking wheel, a third axle in said second wheel, a fourth axle connected on said frame and substantially parallel to said third axle, and a second coupling device extending rearwardly from said fourth axle and having connection with said third axle to enable a pivotal movement of said second raking wheel about said fourth axle whereby said raking wheel is enabled to adapt itself to the ground and substance lying thereupon; and bearings on said frame for supporting said second and fourth axles in vertically spaced relationship.

*18. A raking device according to claim 1 having resilient means, said resilient means being operatively associated with said frame and said coupling device.*

*19. A raking device according to claim 1 having a helical spring connected on one end to said frame and on the other to said coupling device.*

*20. A raking device according to claim 1 wherein said coupling device comprises a crank.*

*21. A raking device according to claim 1 wherein said mobile frame includes at least one running wheel, said running wheel being interconnected to said frame and providing support therefor.*

*22. A raking device according to claim 11 having a helical spring connected on one end to said frame and on the other to said coupling device.*

*23. A raking device according to claim 11 wherein said coupling device comprises a crank.*

*24. A raking device according to claim 11 wherein said mobile frame includes at least one running wheel, said running wheel being interconnected to said frame and providing support therefor.*

*25. A raking device according to claim 16 wherein said coupling device comprises a crank.*

*26. A raking device according to claim 16 wherein said mobile frame includes at least one running wheel, said running wheel being interconnected to said frame and providing support therefor.*

*27. A raking device comprising a mobile ground-supported frame, a freely rotatable raking wheel, a first axle in said wheel, a second axle connected on said frame and substantially parallel to said first axle, a coupling device extending forwardly from said second axle and connecting said first and said second axles to enable a pivotal movement of said raking wheel whereby said raking wheel is enabled to adapt itself to the ground and substance lying thereupon, a pair of springs connected intermediate said frame and said coupling device, one of said springs resisting movement of said coupling device in one direction and the other of said springs resisting movement of said coupling device in the opposite direction.*

*28. A raking device comprising a mobile ground-supported frame, an echelon of freely rotatable raking wheels mounted on said frame, at least two of said wheels each having a first axle, at least two forwardly extending cranks each connected on one end to one of said first axles, at least two second axles connected on said frames parallel to said first axles, each of said cranks being connected at their ends opposite said first axles to one of said second axles to enable a pivotal movement of the corresponding said raking wheel whereby the corresponding said raking wheel is enabled to adapt itself to the ground and substance lying thereupon, helical springs each connected on one end to each of said cranks and on the other end to said frame, and at least one running wheel interconnected to said frame and providing support therefor.*

*29. A raking device comprising a frame, a freely rotatable first raking wheel, a first axle in said first wheel, a second axle connected on said frame and substantially parallel to said first axle, a first coupling device extending forwardly from said second axle and having connection with said first axle to enable a pivotal movement of said raking wheel whereby said raking wheel is enabled to adapt itself to the ground and the substance lying thereupon, a second raking wheel, a third axle in said second raking wheel, and a second coupling device extending rearwardly from said second axle and having connection with said third axle to enable a pivotal movement of said second raking wheel whereby said raking wheel is enabled to adapt itself to the ground and substance lying thereupon.*

*30. A raking device as defined in claim 29 having third and fourth raking wheels, a fourth axle in said third wheel, a fifth axle connected on said frame and substantially parallel to the aforementioned axles, a third coupling device extending forwardly from said fifth axle and having connection with said fourth axle to enable a piv-*

*otal movement of said third raking wheel whereby said third raking wheel is enabled to adapt itself to the ground and the substance lying thereupon, a sixth axle in said fourth raking wheel, a fourth coupling device extending rearwardly from said fifth axle and having connection with said sixth axle to enable a pivotal movement of said fourth raking wheel whereby said fourth raking wheel is enabled to adapt itself to the ground and substance lying thereupon, said frame providing connection between said second and fifth axles.*

*31. A raking device comprising a mobile ground-supported frame having a front end, a freely rotatable first rake wheel adjacent said front end, a first axle in said first rake wheel, a second axle connected on said front end and substantially parallel to said first axle, a first coupling device extending forwardly from said second axle and having connection with said first axle, to enable a pivotal movement of said rake wheel whereby said rake wheel is enabled to adapt itself to the ground and substance lying thereon, a second rake wheel, a third axle in said second wheel, and a second coupling device extending rearwardly from said second axle and having connection with said third axle to enable a pivotal movement of said second rake wheel whereby said rake wheel is enabled to adapt itself to the ground and substance lying thereon.*

References Cited in the file of this patent or the original patent

UNITED STATES PATENTS

| | | |
|---|---|---|
| 468,382 | Beck | Feb. 9, 1892 |
| 2,459,961 | Pollard | Jan. 25, 1949 |
| 2,657,519 | Hill | Nov. 3, 1953 |
| 2,680,343 | Enos | June 8, 1954 |
| 2,712,723 | Ryan | July 12, 1955 |